3,284,853
APPARATUS FOR MOLDING HOLLOW ARTICLES
WITH RECESS IN INNER WALL
Elton G. Moneymaker, Willoughby, and Arthur J. Marx,
Cleveland Heights, Ohio, assignors to General Electric
Company, a corporation of New York
Filed Nov. 14, 1963, Ser. No. 323,825
7 Claims. (Cl. 18—20)

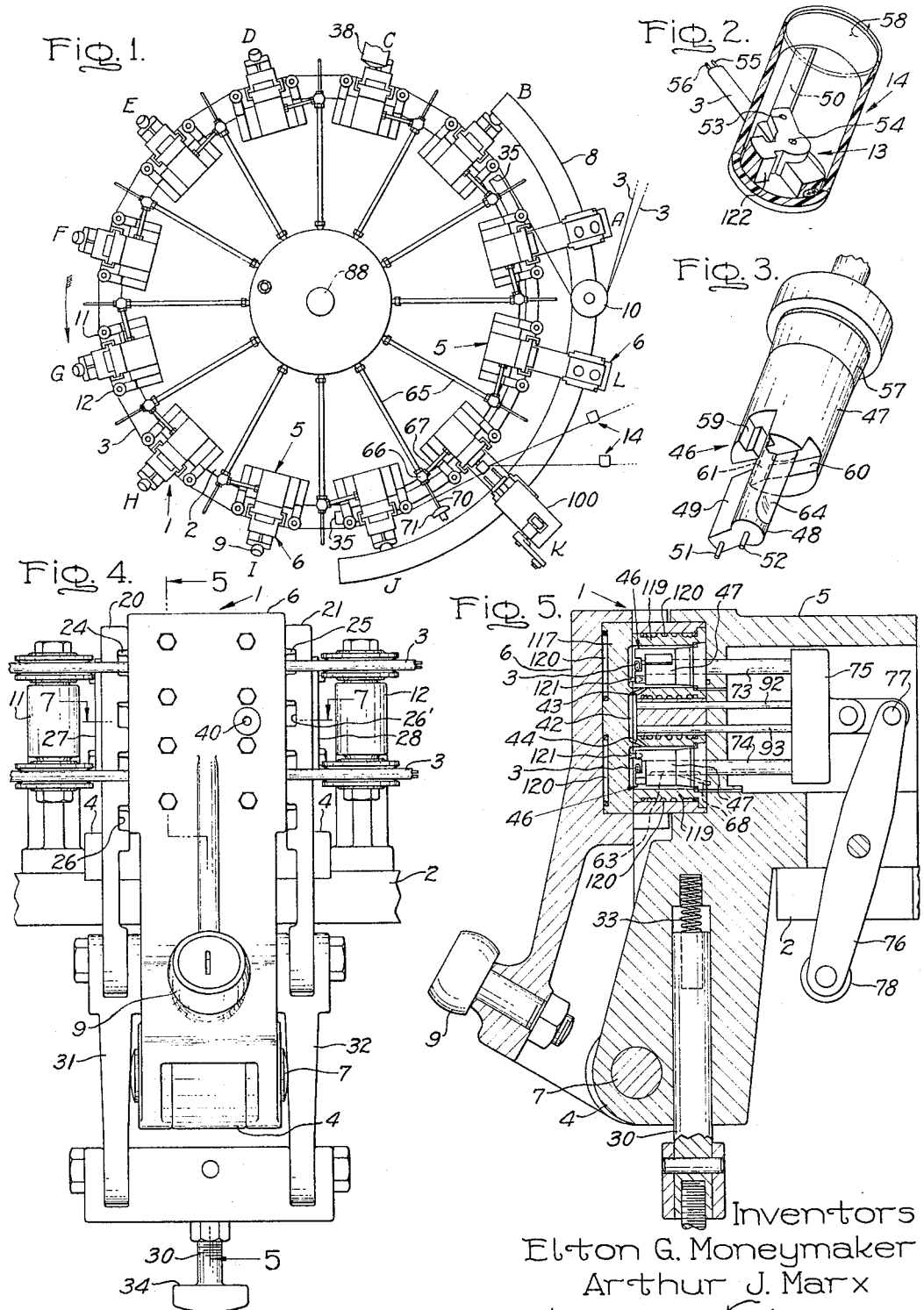

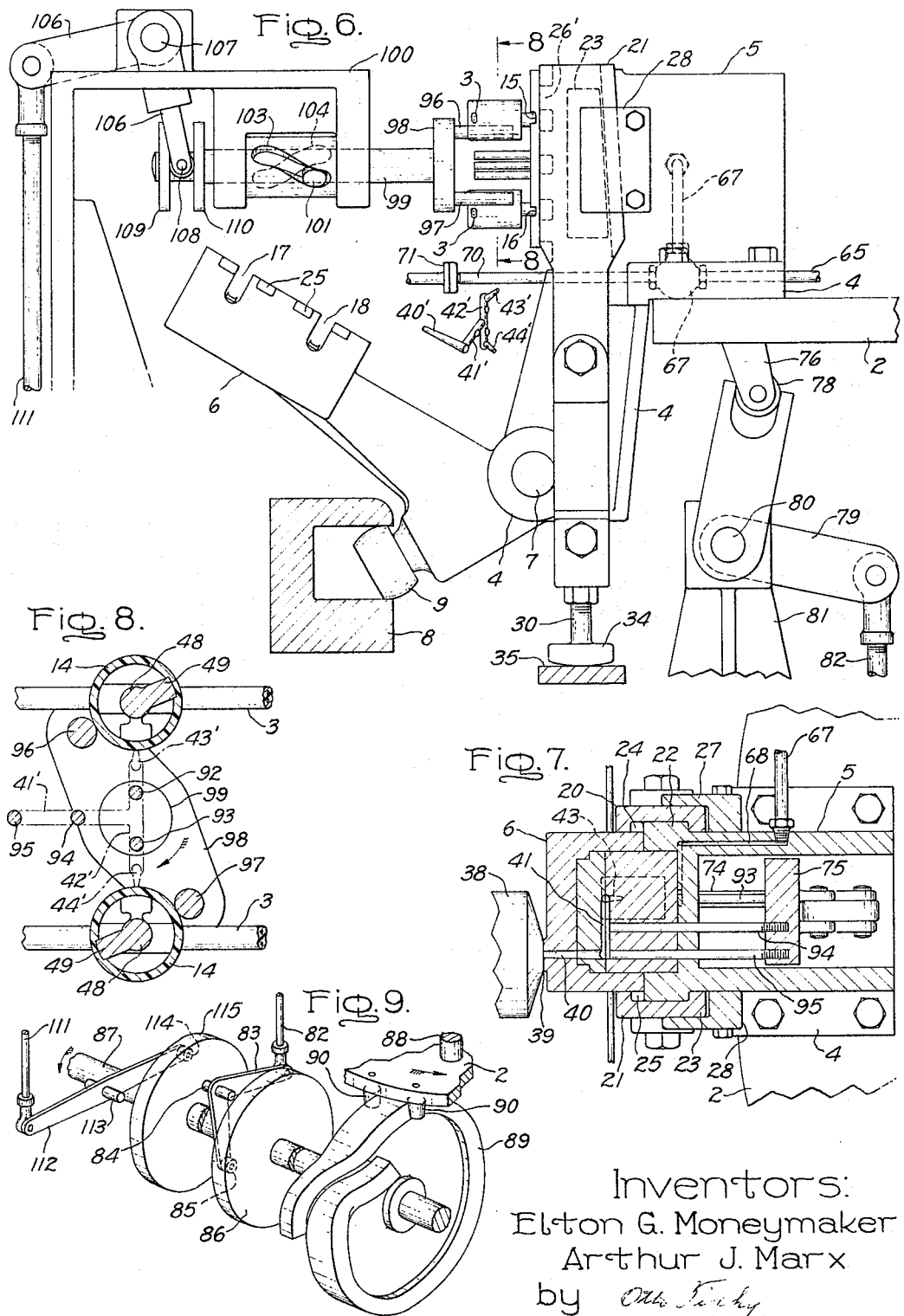

The present invention relates to the molding of plastic material and its principal object is to provide injection molding apparatus for forming a hollow article having an inwardly opening recess in a side wall and from which the article is readily removable.

Another object of the invention is to provide an injection molding apparatus for forming in sequence on the insulated cord of a string set a plurality of socket bodies for electric lamp sockets of the type disclosed and claimed in copending application Serial No. 121,137, filed June 30, 1961, now Patent No. 3,128,141, Krupp et al., patented April 7, 1964 and assigned to the assignee of the present application.

Further objects and advantages of the invention will be apparent from the following description and the drawings accompanying and forming a part of this specification.

The socket disclosed and claimed in the above patent includes a molded socket body of stiffly flexible thermoplastic material having a hollow cylindrical shape and closed at one end. The socket body is provided with an inwardly opening recess in its side wall for accommodating a side strip contact. The side contact makes a pressure fit with the sides of the recess and is provided with protuberances for engaging the screw threads of a lamp base accommodated by the socket. The cord of the string set on which the socket is molded extends laterally of the socket body through the thickness of the end wall.

A feature of the injection molding apparatus of the present invention, which includes a mold having a pair of separable mold sections and a core member defining with said mold sections in the closed position of the latter a cavity of the shape of the socket body, is a composite core member having primary and secondary cores. The primary core is fixedly mounted on one of the mold sections and the secondary core is provided with a lateral projection which forms the side contact accommodating inwardly opening recess in the cylindrical side wall of the socket body. The socket body when molded over the lateral projection on the secondary core is locked in position on the composite core. To unlock or release the socket body from the composite core and strip it from the primary core, the secondary core having the lateral projection is mounted for forward longitudinal movement with respect to the primary core with the mold sections in open position.

The molding surface of the laterally projecting portion of the secondary core is in the form of a rectangular block so that the sides of the recess in the side wall of the socket body do not taper. The molded socket body when stripped from the primary core thus tends to hang on the laterally projecting portion of the secondary core in the forwardmost position of the latter. In order to free the molded socket body completely from the molding apparatus a passage is provided in the composite core which passage is opened on movement of the secondary core from its retracted toward its forwardmost position for the introduction of fluid, such as air, under pressure into the interior of the molded socket body to assist in freeing the socket body. Also, an arm is mounted and actuated so as to strike the socket body in the forwardmost position of the secondary core to loosen it from the laterally projecting portion of the core.

The recess is necessarily formed without taper in its side surface in order to eliminate any forces tending to force the side contact out of the recess. Since the side contact makes a pressure fit with the sides of the recess, as pointed out above, and since the socket body consists of stiffly flexible thermoplastic material such forces would be generated if the sides of the recess tapered from the interior of the socket.

Another feature of the injection apparatus is a split mold including a pair of mold sections one of which is hinged on the other for swinging into a mold closing and a mold opening position and both of which sections define therebetween, when the mold is closed, a pair of aligned openings into that portion of the mold cavity wherein the wall closing the end of the molded socket body is formed. The aligned openings into this portion of the mold cavity accommodate the cord of the string set on which the socket body is molded, are aligned in a direction transverse to the longitudinal axis of the mold cavity and are so positioned that one of the conductors of the pair of mutually insulated conductors of the cord extend along a diameter of the circular end wall of the socket body.

The size of the aligned openings with respect to the size of the cord in cross section is such that the openings are closed against the leakage of plastic material during injection of such material and the molding thereof into the form of the socket body.

The hinged mold section is arranged for movement into a mold open position below the level of the mold cavity so that a plurality of molds may be mounted on the periphery of an indexing turret for the continuous production of string sets including socket bodies molded on the cord in sequence as described later herein.

In the drawings accompanying and forming part of this specification, an injection molding apparatus embodying the present invention is shown in which—

FIG. 1 is a diagrammatic plan view of the molding apparatus.

FIG. 2 is a perspective view of a lamp socket body molded on a two conductor electric cord by the apparatus shown in the drawings.

FIG. 3 is a perspective view of a composite core of the molding apparatus, the primary and secondary cores being longitudinally displaced as at the time of ejection of the socket body.

FIG. 4 is a front view of the mold.

FIG. 5 is a vertical section through the mold taken along the line 5—5 of FIG. 4.

FIG. 6 is a side elevational view of the mold in open position and showing also the ejector means of the apparatus and the means for loosening the molded socket from the secondary core of the composite core shown in FIG. 3.

FIG. 7 is a section along the line 7—7 of FIG. 4, and showing the injection passages for the organic plastic molding material, the ejector mechanism for the sprue and the passage for air into the core member.

FIG. 8 is a showing in side elevation partly sectional, taken along the line 8—8 of FIG. 6 in the direction of the arrows, of the mechanism for loosening the molded socket body from the secondary core of the composite core member and showing also part of the sprue ejecting mechanism, and FIG. 9 is a diagrammatic perspective view of the cams of the drive mechanism for the molding apparatus.

Referring to FIG. 1 of the drawings, the molding apparatus comprises a series of split, multiple, two section molds 1 mounted on the periphery of a turret 2 adapted to be rotated intermittently step-by-step in the direction of the arrow to bring the molds in succession to different stations. At station A the molds are open for the introduction therein of the cords 3 of the string sets. At station B the molds are closed about the cords and at station C the closed molds are charged with hot organic plastic molding material. Stations D, E, F, G, H, I and J are cooling stations and station K is a take-out station at which the molds are open and the socket bodies molded on the cords are removed. The molds are in open position at stations K, L and A.

Each of the multiple, split molds 1 mounted at the periphery of the turret 2 define cavities, each of the shape of the socket body shown in FIG. 2. The main body part 4 of the mold is bolted to the turret 2 and fastens the section 5 of the mold in fixed position on the turret 2. The outer section 6 of the mold is supported on part 4 by the pivot pin 7 for movement into mold closed and mold open positions. In FIG. 5 the mold is shown in closed position and in FIG. 6 the outer mold section 6 is shown in a tilted, mold open position in which it is below the level of the cavities defined by the mold section 5 to allow the socket bodies molded on the cords to be removed from the mold. The mold section 6 remains in its tilted position at stations L and A for the introduction of cords between the open mold sections at station A.

The mechanism for moving the mold section 6 into its open and closed positions includes a stationary cam track 8 and a cam follower in the form of a roller 9 mounted on the mold section 6. The roller 9 engages the cam track 8 which is U-shaped in cross section as shown in FIG. 6. The roller 9 is in engagement with the cam track 8 as the mold is carried by the turret in the direction of the arrow (FIG. 1) from station J to station B. The changes in elevation of the cam track 8 are such that the mold section 6 is moved into its open, tilted position between stations J and K and into its mold closed position between stations A and B. The mold section 6 is in its open position at stations K, L and A.

The cords 3 are drawn from reels (not shown) as the turret 2 is rotated step-by-step and each cord is guided into proper position in the open molds at station A by a stationary guide roller 10 mounted on the frame of the apparatus ahead of station A and the guide rollers 11 and 12 mounted on the turret 2 and located on opposite sides of the mold section 5 as shown in FIGS. 1 and 4.

At station B the cords 3 are clamped between the mold sections 5 and 6, extend across the part of the mold cavities forming the end wall 13 of the socket body 14 (FIG. 2) and are located in the recesses 15 and 16 of the mold section 5 which match the recesses 17 and 18 of the mold section 6. These recesses in the closed position of the mold define openings in opposite sides of the closed mold for accommodating the cords 3 traversing the molds as shown in FIG. 4, the recesses in the mold sections being shown in FIG. 6.

At station B the mold sections 5 and 6 are locked together, after being closed as described above. As best shown in FIGS. 4, 5, 6 and 7 the mold locking mechanism includes slides 20 and 21 mounted for vertical movement on opposite sides of the mold section 5. The slides 20 and 21 have diverging side flanges which in the lowered locking position of the slides engage the wedge-shaped continuous lips 22 and 23, respectively, on the mold section 5 and the series of space lips 24 and 25, respectively, on the mold section 6 to lock the mold sections 5 and 6 together, as shown in FIG. 7. The flange of the slides adapted to engage the series of lips 24 and 25 each have a series of slots 26 and 26' for passage of the lips 24 and 25 therethrough as the mold section 6 is moved into and out of its closed position. Brackets 27 and 28 are secured to the mold section 5 and overlap the slides 20 and 21, respectively, to maintain the slides in engagement with the lips on the mold sections by preventing lateral movement of the slides away from the mold sections.

Movement of the slides 20 and 21 into their locking and unlocking positions is accomplished through the vertical push rod 30 mounted for sliding movement on the mold part 4 as shown in FIGS. 4, 5 and 6 and connected to the slide members 20 and 21 by the links 31 and 32, respectively. The rod 30 is urged downwardly by spring 33 (FIG. 5) in part 4 to hold the slides 20 and 21 in their locking position at stations B to J, inclusive. At stations K to A, inclusive, the slides 20 and 21 are in a lifted position in which the mold sections are unlocked. The slides 20 and 21 are lifted against the force of spring 33 to unlock the molds by engagement of the head 34 of the rod 30 with the stationary track 35. The changes in elevation along track 35 are such that the slides 20 and 21 are in their lifted, unlocked position with respect to the mold sections 5 and 6 before the mold section 6 is tilted into its open position as the mold is carried from station J to station K and are in a lowered or locked position after the mold section 6 is moved into its closed position as the mold is carried from station A to station B.

The locked molds 1 are carried from station B to station C where the injection nozzle 38 is brought into engagement with the opening 39 of the injection passages of the mold for filling the mold cavities with hot thermoplastic material, such as polypropylene. The communicating passages leading from the said opening 39 into the mold cavities are shown in FIGS. 5 and 7 and include the tapered passage 40 extending through the mold section 6, the passages 41 and 42 defined by the closed mold sections 5 and 6 and the passages 43 and 44 defined by the mold section 5 and opening into the sides of the mold cavities. The shape of the sprue filling the passages 40 to 44 inclusive is shown in FIG. 6 in a perspective view as it is ejected from the open mold, as described below. The parts of the sprue formed by the passages are identified by the same numbers primed.

Each of the split, multiple molds 1 has a composite core 46 in each of its socket molding cavities, one of which is illustrated in FIG. 3 of the drawings. The core shapes the interior surfaces of the molded socket body in the form shown in FIG. 2 of the drawings. Each composite core 46 is made up of a primary core 47 and secondary core 48, the primary core being fixedly mounted on the mold section 5 as shown in FIG. 5 of the drawings. The secondary core 48 is mounted for movement longitudinally of the primary core 47 between a retracted molding position within the primary core as shown in FIG. 5 and a forward ejection position with respect to the primary core (FIG. 3) in which last position the molded socket body 14 with the conductor cord 3 molded therein may be removed from the molding apparatus as described below.

The secondary core 48 has a lateral projection 49 thereon for forming a side strip electrical contact accommodating recess 50 in the inner surface of the cylindrical side wall of the socket body 14 and has also two longitudinal projections 51 and 52 at the foremost end thereof for forming cavities 53 and 54, respectively, in the end wall 13 of the socket body directly above each of the electrical conductors 55 and 56, respectively, of the cord 3 molded in and extending through the end wall 13 of the socket body 14 as shown in FIG. 2. The cavities facilitate insertion of the electrical socket contacts consisting of a center contact and a side contact each having pointed ends which ends, in assembling the socket, are thrust through the cavities 53 and 54 and through the conductors 55 and 56 located therebeneath to make electrical contact with the conductors and to stake the socket body to the cord 3. The conductor 56 of the cord 3 extends along a diameter of the end wall 13.

The primary core 47 has a cylindrical outer surface slightly flaring at its inner end 57 to form the tapered inner surface 58 at the open end of the socket body 14 and three recesses 59, 60 and 61 at its outer end which, together with the outer end surface of the secondary core 48 in the molding position of the latter shape the end wall 13 of the socket body as shown in FIG. 2 of the drawings.

A passage 63 for air under pressure is defined by the inner cylindrical surface of the primary core 47 and groove 64 in the secondary core 48. The passage 63 is closed when the secondary core 48 is in its retracted molding position and is opened on movement of the secondary core toward its forwardmost position to introduce air into the interior of the molded socket body to facilitate removal of the socket body from the primary core 47. The air is supplied to passage 63 from a source (not shown) through pipe 65, valve 66, pipe 67 and passages 68 in the mold section 5 as shown in FIGS. 1, 5, 6 and 7 of the drawings. The valve 66 is in its closed position at all stations except the take-out station K. At station K the valve is open to admit air under pressure to the passage 63 as the mold approaches station K, remains open while the mold is at this station and is closed as the mold is carried away from station K. The operation of the valve 66 is controlled by the spring pressed valve stem 70 which engages the face of the stationary cam 71 as the mold approaches station K. The face of cam 71 is shaped so as to move the valve stem 70 into its open position against the force of its actuating spring as the mold approaches station K, hold it in open position while the mold is at dwell at station K and release it to be moved by its spring back to a closed position before the mold is carried away from station K after ejection of the molded socket body as described below.

At station K the secondary core 48 is moved forwardly to strip the molded socket body 14 from the primary core 47. During the forward movement of the secondary core the air passage 63 supplied with air under pressure as described is opened to facilitate the stripping action by introducing the pressurized air between the inner surface of the socket body and the outer surface of the primary core 47.

The mechanism for moving the secondary core 48 in a forward direction at station K includes the ejector pins 73 and 74 (FIG. 5), one for each of the secondary cores of the mold, the connecting plate 75 to which the ejector pins are fastened, the lever arm 76 pivotally connected to the connecting plate at 77, the roller 78 mounted on the lever arm, the angle lever arm 79 (FIG. 6) pivoted at 80 on the support 81 and engaging the roller 78, the connecting rod 82 shown in FIGS. 6 and 9, the angle lever arm 83 pivoted at 84 on the frame of the apparatus, the cam follower 85 and the face cam 86 affixed to the drive shaft 87 of the turret 2 of the apparatus. The turret is mounted for rotation on column 88.

On each revolution of the drive shaft 87 the index cam 89 shown in FIG. 9 moves the turret 2 provided with a series of spaced cam followers 90 one step around the supporting column 88 of the turret in the direction of the arrow to carry each mold 1 into a succeeding station with a dwell at each station. As a mold is carried into station K the roller 78 is brought into engagement with the arm 79. On each revolution of the drive shaft 87 and with the turret at dwell the ejector pins 73 and 74 actuated as above move the secondary cores 48 of the particular mold 1 then located at section K from a retracted molding to a forward position and back again with a dwell in the forward position for removal of the molded socket bodies from the lateral projections 49 on the secondary cores 48, as described below.

As the socket bodies are carried forward by the secondary cores their connection with the plastic material filling the injection passages 43 and 44 is broken. The sprue constituted by the organic plastic material in the injection passages 40 to 44 is exposed on opening of the mold and is supported solely by mold section 5. The sprue is ejected from the mold section 5 by the same mechanism by which the secondary cores 48 are moved into their foremost positions. For this purpose four ejector pins 92, 93, 94 and 95 (FIGS. 5, 7 and 8) are connected to the plate 74 and extend through the mold section 5 into engagement with the sprue as shown. As the pins 92 to 95 are advanced the sprue is forced from the mold section 5 and falls away from the mold as shown in FIG. 6.

Also at station K is mounted a mechanism for forcing the mold socket bodies 14 from the block-shaped lateral projections 49 on the secondary cores 48. This mechanism is shown in FIGS. 1, 6 and 8 of the drawings and includes a pair of arms 96 and 97 which are brought into striking engagement with the sockets 14 in the forwardmost positions of the secondary cores 48 and at a point diametrically opposite the lateral extensions 49 on the secondary cores 48, as shown in FIG. 8, to free the socket bodies from the molds.

The arms 96 and 97 are mounted on a cross piece 98 affixed to the end of the spindle 99 which is supported by the bracket 100 secured to the frame of the apparatus. The spindle 99 is mounted for reciprocation in a longitudinal direction to bring the arms 96 and 97 forward into engaging position with respect to the socket bodies 14. As the spindle 99 is moved forward it is caused to rotate on its longitudinal axis by the pins 101 and 102 engaging arcuate slots 103 and 104 in the sleeve 105 affixed to the bracket 100. The spindle 99 is actuated by the lever arm 106 pivoted at 107 on the bracket 100, the roller 108 mounted on the lever arm 106 and engaging the discs 109 and 110 affixed to the spindle 99, the rod 111 connecting lever arm 106 to lever arm 112 (FIG. 9) which is pivoted at 113 on the frame. The arm 112 has a cam follower 114 engaging the face cam 115 affixed to the drive shaft 87 of the apparatus. As the shaft 87 together with the cam 115 is rotated arms 96 and 97 are moved from a retracted position with respect to the socket bodies 14 into a forward position while at the same time being rotated as described above to strike the socket bodies and release them from the secondary cores 48 of the mold. Thereafter, the arms 96 and 97 are moved back to their retracted position so that the succeeding mold may be carried into station K without interference.

On release of the socket bodies 14 from the mold 1 at station K and on movement of the mold from station K toward station L the cords 3 with the socket bodies molded thereon are pulled away from the molding apparatus in a direction substantially tangent to the turret 2. Thereafter, each of the socket bodies is provided with a center pin contact inserted in the cavity 54 with its end piercing and making electrical contact with conductor 56 and a side strip contact inserted in cavity 53 and recess 50 with its end piercing and making electrical contact with conductor 55. The cords may be divided into lengths suitable for lighting string sets and a male and female plug may be attached to opposite ends of each string set in the conventional manner.

The mold sections 5 and 6 include mold inserts 117 and 119 defining with the main body of the mold sections passages 120 for the circulation of cooling fluid about the mold cavities (FIG. 5). The passages are connected with a source (not shown) of cooling fluid which is circulated through the mold sections continuously during operation of the molding apparatus. Such cooling systems are of conventional structure and well known in the art and have not been illustrated in the drawings as they constitute no part of the present invention.

The mold section 6 is provided with projections 121 (FIG. 5) which form an outwardly opening cavity in the parts 122 of the end wall 13 of each of the socket bodies 14. The cavities thus formed in the socket bodies accommodate the end of a clip for supporting the socket body in use of the string sets for Christmas tree decoration, for example.

While the best mode of carrying out the invention has been shown and described above, it will be understood that changes and modifications may be made by those skilled in the art without departure from the spirit and scope of the invention as defined in the appended claims.

What we claim as new and desire to secure by Letters Patent of the United States is:

1. An injection molding apparatus for forming hollow articles having an inwardly opening recess in a side wall comprising a pair of separable mold sections and a composite core member including a primary and a secondary core defining with said mold sections in the closed position of the latter a cavity of the shape of the desired article, one of said mold sections accommodating and surrounding laterally the composite core member and defining therewith a cavity of the shape of the side wall of the hollow article, the primary core being fixedly mounted on the composite core member accommodating mold section, the secondary core having a laterally projecting molding surface for forming the side wall recess and being mounted for longitudinal movement with respect to the primary core on separation of said mold sections from a retracted position wherein the molded article is locked on the composite core by the laterally projecting molding surface of the secondary core into a forward position to strip the molded article from the primary core and support the article in front of the mold section carrying the primary core for facilitating separation of the article from the laterally projecting molding surface of the secondary core.

2. An injection molding apparatus according to claim 1 wherein the molding side surface of the primary core is generally cylindrical and the molding surface of the laterally projecting portion of the secondary core is of rectangular block shape.

3. An injection molding apparatus according to claim 1 wherein the mold section carrying the primary core is fixedly mounted and the other of said mold sections is hinged thereon for swinging between a mold closing and a mold opening position in which last position the hinged mold section is out of line with the mold cavity to facilitate removal of the molded article from the mold.

4. An injection molding apparatus according to claim 1 wherein the primary and secondary cores define a passage closed in the retracted molded position of the secondary core and opened on forward movement of the secondary core for the introduction of fluid under pressure into the interior of the molded article to facilitate separation of the molded article from the primary core.

5. An injection molding apparatus according to claim 1 wherein means are provided for striking the molded article at a point opposite the laterally projecting molding surface of the secondary core with the secondary core in its forward position to free the molded article from the secondary core.

6. An injection molding apparatus for forming on an insulated electric cord a socket body having an integral end wall and an inwardly opening recess in a cylindrical side wall comprising a pair of separable mold sections and a composite core member having a primary and a secondary core defining with said mold members in the closed position of the latter a cavity of the shape of the socket body, said mold sections in their closed position defining cord accommodating openings into the part of the mold cavity having the shape of the end wall of the socket body, said cord accommodating openings being in a line transverse to the mold cavity, one of said mold sections accommodating and surrounding laterally the composite core member and defining therewith a cavity of the shape of the cylindrical side wall of the socket body, the primary core being fixedly mounted on the composite core accommodating mold section, the secondary core having a laterally projecting molding surface for forming the side wall recess and being mounted for longitudinal movement with respect to the primary core on separation of said mold sections from a retracted molding position wherein the molded socket body is locked on the composite core by the laterally projecting molding surface of the secondary core into a forward position to strip the socket body from the primary core and support the socket body in front of the mold section carrying the primary core for facilitating separation of the socket body from the laterally projecting molding surface of the secondary core.

7. An injection molding apparatus for forming in sequence on an insulated electric cord a plurality of socket bodies having an integral end wall and an inwardly opening recess in a cylindrical side wall comprising a turret mounted for rotation on a vertical axis, a plurality of molds mounted on the periphery of said turret, means for indexing the turret to carry the molds in sequence to each of a plurality of stations with a dwell period at each station, a cord feeding apparatus at one of said stations, an injection apparatus at a succeeding station and a socket removing apparatus at a take-out station succeeding the injection station, each of said molds comprising a pair of separable mold sections and a composite core member having a primary and a secondary core defining with said mold members in the closed position of the latter a cavity of the shape of the socket body, said mold sections in their closed position defining cord accommodating openings into the part of the mold cavity having the shape of the end wall of the socket body, said cord accommodating openings being in a line transverse to the mold cavity, the primary core being fixedly mounted on one of said mold sections, the secondary core having a laterally projecting molding surface for forming the side wall recess and being mounted for longitudinal movement with respect to the primary core on separation of said mold sections from a retracted molding position wherein the molded socket body is locked on the composite core by the laterally projecting molding surface of the secondary core into a forward position to strip the socket body from the primary core and support the socket in front of the mold section carrying the primary core, the mold section carrying the primary core being affixed to the turret and the other of said mold sections being hinged on the fixedly mounted mold section for swinging outwardly of the turret between a mold closing and a mold opening position, the part of the mold cavity in the fixedly mounted mold section facing radially outward of the turret in the open position of the mold and the hinged mold section being below the level of the cavity in its fully open position for removal of the molded socket body from the mold, means mounted separately from the turret for swinging the hinged mold section from an open position at said cord feeding station to a closed position at said injection station and thereafter to an open position at said take-out station, means for locking said mold sections together around the cord between the cord feeding station and the take-out station and means for moving said secondary core from its retracted molding position to its forwardmost position and back again with a dwell in its forwardmost position at the take-out station, and means at said take-out station for striking said socket body with said secondary core at dwell at a point diametrically opposite the laterally projecting portion of said secondary core to loosen said socket body from said secondary core and means for actuating the two last-mentioned means in proper time relation.

References Cited by the Examiner
UNITED STATES PATENTS

| | | | |
|---|---|---|---|
| 3,009,197 | 11/1961 | Hahn | 18—5 |
| 3,128,505 | 4/1964 | Ludwig | 18—45 |
| 3,183,292 | 5/1965 | Dvoracek | 18—2 |

J. SPENCER OVERHOLSER, *Primary Examiner.*

W. L. McBAY, *Assistant Examiner.*